(12) United States Patent
Hrovat et al.

(10) Patent No.: US 10,293,653 B2
(45) Date of Patent: May 21, 2019

(54) OBSTACLE AVOIDANCE SYSTEM WITH ACTIVE SUSPENSIONS

(71) Applicant: Ford Global Technologies, LLC, Dearborn, MI (US)

(72) Inventors: Davor David Hrovat, Ann Arbor, MI (US); Hongtei Eric Tseng, Canton, MI (US); Jianbo Lu, Northville, MI (US); Li Xu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/869,304

(22) Filed: Sep. 29, 2015

(65) Prior Publication Data
US 2017/0087951 A1 Mar. 30, 2017

(51) Int. Cl.
| | | |
|---|---|---|
| *B60G 17/019* | (2006.01) | |
| *B60G 17/0165* | (2006.01) | |
| *B60G 17/018* | (2006.01) | |
| *B60G 17/0195* | (2006.01) | |
| *B62D 15/02* | (2006.01) | |

(52) U.S. Cl.
CPC ....... *B60G 17/0165* (2013.01); *B60G 17/018* (2013.01); *B60G 17/019* (2013.01); *B60G 17/0195* (2013.01); *B62D 15/0265* (2013.01); *B60G 2400/20* (2013.01); *B60G 2400/823* (2013.01); *B60G 2500/30* (2013.01); *B60G 2800/242* (2013.01); *B60G 2800/914* (2013.01)

(58) Field of Classification Search
None
See application file for complete search history.

(56) References Cited

U.S. PATENT DOCUMENTS

| | | | | |
|---|---|---|---|---|
| 3,625,303 | A | | 12/1971 | Cameron |
| 4,714,271 | A | * | 12/1987 | Buma ................ B60G 17/0165 280/5.503 |
| 4,726,604 | A | * | 2/1988 | Asami ................ B60G 21/0556 280/5.514 |
| 5,162,996 | A | * | 11/1992 | Matsumoto .......... B60G 17/018 280/5.519 |
| 5,593,175 | A | * | 1/1997 | Oda ......................... B60G 3/16 104/281 |
| 6,732,033 | B2 | * | 5/2004 | LaPlante ................ B60G 17/08 280/5.5 |

(Continued)

FOREIGN PATENT DOCUMENTS

| | | |
|---|---|---|
| DE | 10157426 A1 | 6/2003 |
| DE | 102004036682 A1 | 3/2006 |

(Continued)

OTHER PUBLICATIONS

Search Report dated Mar. 13, 2017 for Great Britain Patent Application No. GB 1616453.5.

*Primary Examiner* — Truc M Do
(74) *Attorney, Agent, or Firm* — Frank Lollo; James P. Muraff; Neal, Gerber & Eisenberg LLP

(57) ABSTRACT

The present disclosure generally relates to an obstacle avoidance system with active suspensions. The obstacle avoidance system uses one or more active suspensions to lift or jump one or more corresponding wheels over an obstacle in the vehicle's path to avoid contact with the obstacle when the vehicle cannot practically drive over, steer around, or stop before hitting the obstacle.

18 Claims, 8 Drawing Sheets

(56) References Cited

U.S. PATENT DOCUMENTS

| | | | |
|---|---|---|---|
| 7,334,801 B2 | 2/2008 | Hohmann | |
| 8,050,863 B2* | 11/2011 | Trepagnier | B60W 30/00 |
| | | | 180/167 |
| 8,075,002 B1* | 12/2011 | Pionke | B60G 17/02 |
| | | | 280/5.5 |
| 8,333,390 B2* | 12/2012 | Linsmeier | B60G 17/018 |
| | | | 280/5.514 |
| 8,614,518 B2* | 12/2013 | Li | B60G 17/019 |
| | | | 290/1 R |
| 8,788,146 B1 | 7/2014 | Lu et al. | |
| 8,981,918 B2* | 3/2015 | Panse | B60G 17/017 |
| | | | 280/5.514 |
| 9,259,987 B2* | 2/2016 | Nettelmann | B60G 11/27 |
| 9,272,599 B1* | 3/2016 | Cook, Jr. | B60G 17/0528 |
| 9,387,742 B2* | 7/2016 | Van Raaphorst | B60G 17/052 |
| 9,522,586 B2* | 12/2016 | Lu | B60G 17/0165 |
| 9,643,466 B1* | 5/2017 | Christoff | B60G 17/015 |
| 9,702,349 B2* | 7/2017 | Anderson | F03G 7/08 |
| 2006/0173596 A1 | 8/2006 | Hohmann | |
| 2008/0119984 A1* | 5/2008 | Hrovat | B60G 17/0162 |
| | | | 701/38 |
| 2008/0314656 A1* | 12/2008 | Brehob | B60G 3/01 |
| | | | 180/7.1 |
| 2009/0283977 A1* | 11/2009 | Michel | B60G 7/04 |
| | | | 280/6.157 |
| 2010/0320704 A1* | 12/2010 | Kolp | B60G 17/016 |
| | | | 280/5.514 |
| 2013/0103259 A1* | 4/2013 | Eng | B60G 17/019 |
| | | | 701/37 |
| 2013/0335260 A1* | 12/2013 | Kuehnle | G01S 7/411 |
| | | | 342/70 |
| 2014/0039758 A1 | 2/2014 | Schindler et al. | |
| 2014/0265170 A1* | 9/2014 | Giovanardi | F15B 13/0444 |
| | | | 280/5.5 |
| 2015/0006030 A1 | 1/2015 | Bennett | |
| 2015/0145220 A1 | 5/2015 | Yellambalase et al. | |

FOREIGN PATENT DOCUMENTS

| | | |
|---|---|---|
| DE | 102012024086 A1 | 6/2014 |
| KR | 20140045684 A | 4/2014 |

* cited by examiner

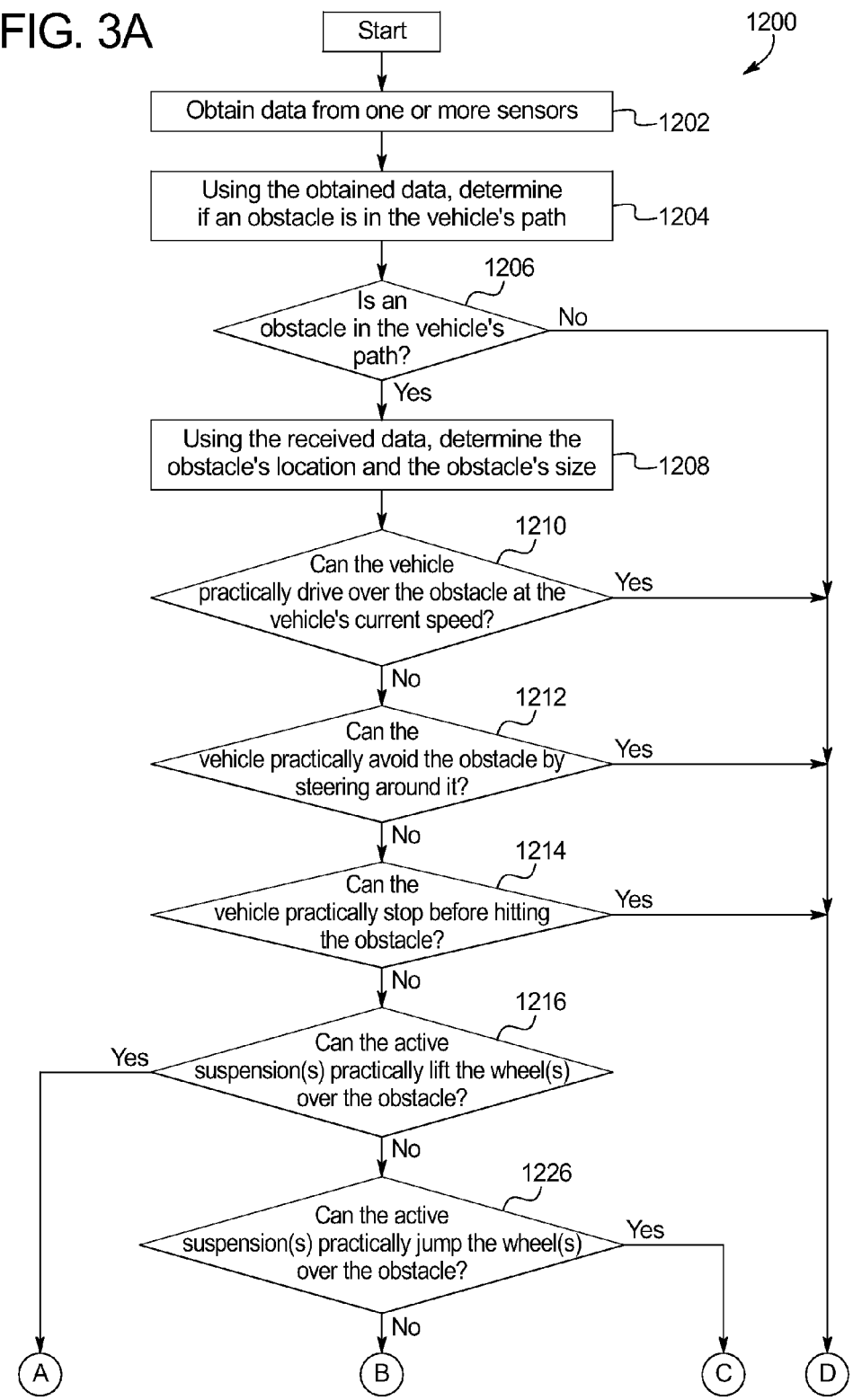

OBSTACLE AVOIDANCE SYSTEM WITH ACTIVE SUSPENSIONS

TECHNICAL FIELD

The present disclosure generally relates to an obstacle avoidance system with active suspensions. More particularly, the obstacle avoidance system of the present disclosure uses one or more active suspensions to lift or jump one or more corresponding wheels over an obstacle in the vehicle's path to avoid contact with the obstacle.

BACKGROUND

Drivers commonly encounter obstacles—such as potholes, rocks, fallen branches, and other debris—in the roadway when driving their vehicles. In certain instances, a driver may find it practically impossible to swerve around an obstacle in the vehicle's path or stop the vehicle before it hits the obstacle. For instance, a driver who is driving on a rainy night may recognize a large tree branch in the vehicle's path too late to practically swerve around the tree branch or to stop the vehicle on the wet road surface before colliding with the tree branch. There is a continuing need for new and improved systems that enable a vehicle to avoid an obstacle in the vehicle's path when the vehicle cannot practically steer around the obstacle or stop before hitting the obstacle.

SUMMARY

The appended claims define this application. The Specification summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide an obstacle avoidance system that uses one or more active suspensions to lift or jump one or more corresponding wheels over an obstacle in the vehicle's path to avoid contact with the obstacle when the vehicle cannot practically drive over, steer around, or stop before hitting the obstacle.

According to one embodiment, an obstacle avoidance system comprises a sensor configured to obtain data external to a vehicle; an active suspension coupled to a wheel of the vehicle; and a controller configured to use the obtained data to identify an obstacle in the vehicle's path and, if the vehicle cannot steer around the obstacle or stop before hitting the obstacle, control the active suspension to elevate the wheel over the obstacle.

According to another embodiment, an obstacle avoidance method comprises obtaining, by a sensor, data external to a vehicle; identifying, by a controller using the data, an obstacle in the vehicle's path; determining, by the controller using the data, whether the vehicle can steer around or stop before hitting the obstacle; and if the vehicle cannot steer around or stop before hitting the obstacle, controlling, by the controller, an active suspension to elevate a vehicle wheel over the obstacle.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

FIGS. 3A and 3B include a flowchart of an example process or method of operating the obstacle avoidance system of the present disclosure.

DETAILED DESCRIPTION OF EXAMPLE EMBODIMENTS

Obstacle Avoidance System

While the obstacle avoidance system of the present disclosure may be embodied in various forms, the Figures show and this Specification describes some exemplary and non-limiting embodiments of the obstacle avoidance system. The present disclosure is an exemplification of the obstacle avoidance system and does not limit the obstacle avoidance system to the specific illustrated and described embodiments. Not all of the depicted or described components may be required, and some embodiments may include additional, different, or fewer components. The arrangement and type of the components may vary without departing from the spirit or scope of the claims set forth herein.

1. Obstacle Avoidance System Components

Figure 1:
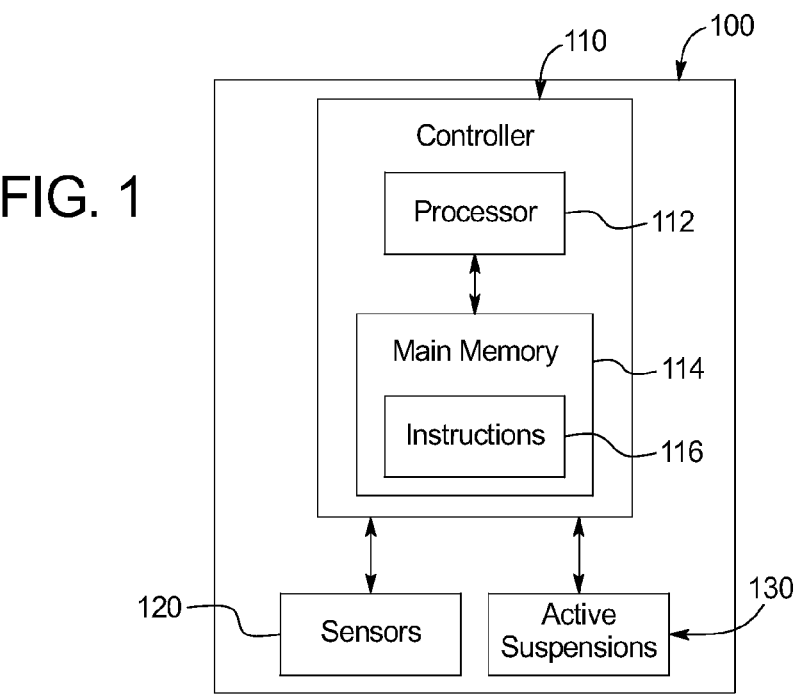
FIG. 1 is a block diagram including components of one embodiment of the obstacle avoidance system of the present disclosure.

The obstacle avoidance system of the present disclosure uses one or more active suspensions to lift or jump one or more corresponding wheels over an obstacle in the vehicle's path to avoid contact with the obstacle when the vehicle cannot practically drive over, steer around, or stop before hitting the obstacle. FIG. 1 illustrates one example embodiment of the obstacle avoidance system 100. Other embodiments of the obstacle avoidance system may include different, fewer, or additional components than those described below and shown in FIG. 1.

The obstacle avoidance system 100 includes a controller 110 including at least one processor 112 in communication with a main memory 114 that stores a set of instructions 116. The processor 112 is configured to communicate with the main memory 114, access the set of instructions 116, and execute the set of instructions 116 to cause the obstacle avoidance system 100 to perform any of the methods, processes, and features described herein.

The processor 112 may be any suitable processing device or set of processing devices such as, but not limited to: a microprocessor, a microcontroller-based platform, a suitable integrated circuit, or one or more application-specific integrated circuits (ASICs). The main memory 114 may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); or read-only memory.

The obstacle avoidance system 100 includes one or more sensors 120 in communication with the controller 110. Certain of the sensors 120 obtain data about the environment surrounding the vehicle (and particularly in front of the vehicle) and others obtain data about components of the vehicle itself. The sensors 120 transmit the data to the controller 110 for further processing. The sensors 120 may be any suitable sensors such as, but not limited to: infrared sensors, cameras or other visual sensors, ultrasonic sensors, RADAR, LIDAR, laser-scan sensors, inertial sensors (for example, a suitable inertial measurement unit), wheel speed sensors, road condition sensors (to directly measure certain road conditions), rain sensors, suspension height sensors, steering wheel angle sensors, steering torque sensors, brake pressure sensors, tire pressure sensors, and/or a Global Positioning System or other vehicle location or navigation sensor.

The obstacle avoidance system 100 also includes a plurality of active suspensions 130. Each active suspension is associated with a different wheel of the vehicle 10. In certain embodiments each wheel is associated with an active suspension, while in other embodiments fewer than all of the wheels are each associated with an active suspension. The active suspensions 130 are in communication with the controller 110 such that the controller can control operation of (at least) the actuators of the active suspensions 130.

Figure 2:
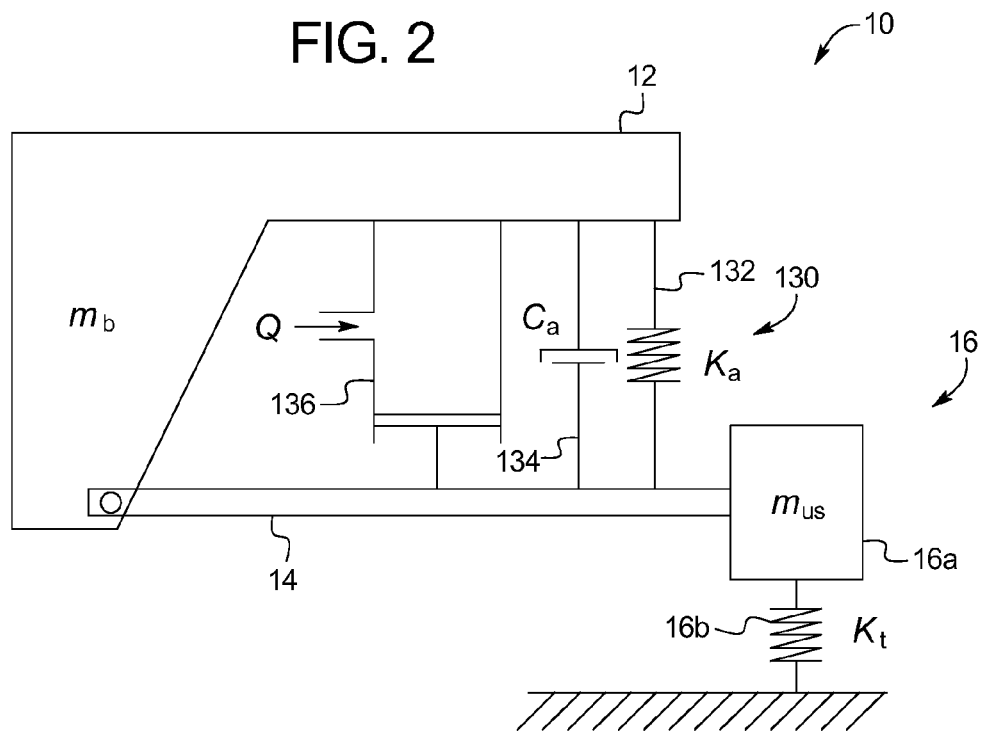
FIG. 2 is a schematic of one wheel of a vehicle including the active suspension of the present disclosure.

FIG. 2 is a schematic diagram of one wheel 16 of a vehicle 10 including the active suspension 130. The wheel 16 is represented by an unsprung mass $m_{us}$, and the tire deflection is represented by spring 16b having a spring constant $K_r$. The vehicle 10 includes a vehicle body 12 and a control arm 14 (which may be any suitable device) attaching the wheel 16 to the vehicle body 12. The active suspension 130 is disposed between the vehicle body 12 and the control arm 14 and supports the vehicle body 12 above the wheel 16. The active suspension 130 includes: (1) a suspension spring 132 having a suspension spring constant $K_a$, (2) a suspension damper 134 having a suspension damping coefficient $C_a$, and (3) an actuator 136. In this embodiment, the actuator 136 is a hydraulic actuator controllable by controlling fluid flow Q into and out of the actuator 136, though any suitable actuator, such as a motor-based actuator, may be used.

In this embodiment, the suspension spring 132, the suspension damper 134, and the actuator 136 are in parallel. In other embodiments, the suspension spring and the suspension damper are in parallel with one another and the actuator is in series with both the suspension spring and the suspension damper.

As described in detail below, the obstacle avoidance system uses the active suspension 130 and, particularly, the actuator 136, to lift the wheel 16 over certain obstacles in the vehicle's path (such as small depressions or low-profile objects) or jump the wheel 16 over other obstacles in the vehicle's path (such as large depressions or high-profile objects), as described in detail below.

2. Operation of the Obstacle Avoidance System

Figure 3B:
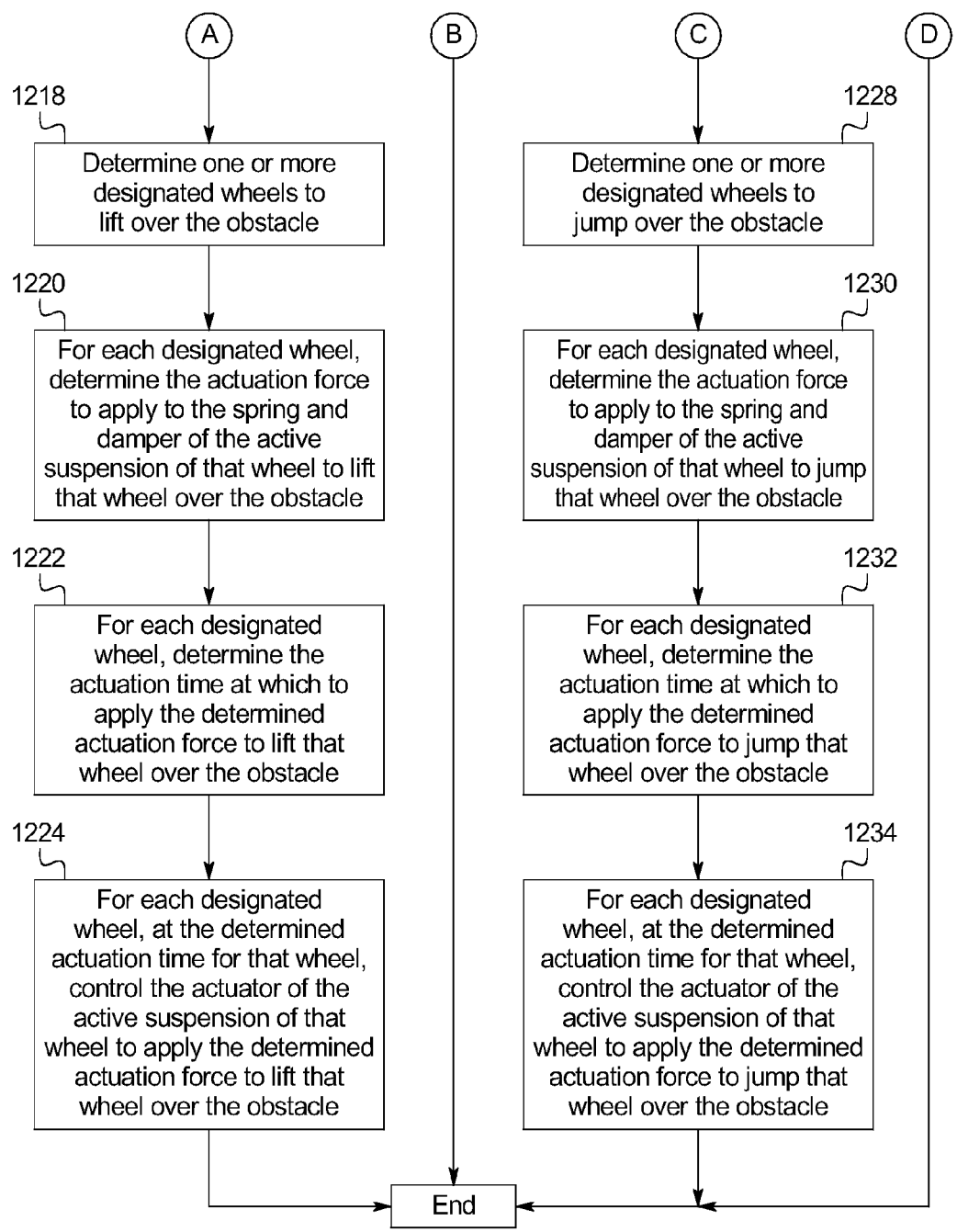

FIGS. 3A and 3B include a flowchart of an example process or method 1200 of operating the obstacle avoidance system of the present disclosure to identify an obstacle located in the vehicle's path, determine whether to lift or jump one or more of the vehicle's wheels over the obstacle, and if so control the vehicle's active suspension(s) to lift or jump the vehicle's wheel(s) over the obstacle. In various embodiments, process 1200 is represented by a set of instructions stored in one or more memories and executed by one or more processors (such as those described above in connection with FIG. 1). Although process 1200 is described with reference to the flowchart shown in FIGS. 3A and 3B, many other processes of performing the acts associated with process 1200 may be employed. For example, the order of certain of the illustrated blocks may be changed, certain of the illustrated blocks may be optional, or certain of the illustrated blocks may not be employed.

In operation of this embodiment, the obstacle avoidance system obtains data from one or more sensors, as indicated by block 1202. Using this obtained data, the obstacle avoidance system determines if an obstacle is in the vehicle's path, as indicated by block 1204. If at diamond 1206 the obstacle avoidance system determines that there is no obstacle in the vehicle's path, process 1200 ends. On the other hand, if at diamond 1206 the obstacle avoidance system determines that there is an obstacle in the vehicle's path, the obstacle avoidance system uses the obtained data to determine the obstacle's location and the obstacle's size, as indicated by block 1208.

The obstacle avoidance system then determines if the vehicle can practically drive over the obstacle at the vehicle's current speed, as indicated by diamond 1210. If so, process 1200 ends. On the other hand, if at diamond 1210 the obstacle avoidance system determines that the vehicle cannot practically drive over the obstacle at the vehicle's current speed, the obstacle avoidance system determines if the vehicle can practically avoid the obstacle by steering around it, as indicated by diamond 1212. If so, process 1200 ends. On the other hand, if at diamond 1212 the obstacle avoidance system determines that the vehicle cannot practically avoid the obstacle by steering around it, the obstacle avoidance system determines if the vehicle can practically stop before hitting the obstacle, as indicated by diamond 1214. If so, process 1200 ends.

On the other hand, if at diamond 1214 the obstacle avoidance system determines that the vehicle cannot practically stop before hitting the obstacle, the obstacle avoidance system determines if the active suspension(s) of the vehicle can practically lift the wheel(s) over the obstacle, as indicated by diamond 1216. If so, the obstacle avoidance system determines one or more designated wheels to lift over the obstacle, as indicated by block 1218. That is, the obstacle avoidance system determines the particular wheels of the vehicle that must be lifted to avoid contacting the obstacle.

For each designated wheel, the obstacle avoidance system determines the actuation force (and the appropriate direction) to apply to lift that wheel over the obstacle, as indicated by block 1220. For each designated wheel, the obstacle avoidance system also determines the actuation time at which to apply the determined actuation force (in the appropriate direction) to lift that wheel over the obstacle, as indicated by block 1222. For each designated wheel, at the determined actuation time for that wheel, the obstacle avoidance system applies the determined actuation force (in the appropriate direction) using the actuator of the active suspension of that wheel to lift that wheel over the obstacle, as indicated by block 1224. Process 1200 then ends.

If at diamond 1216 the obstacle avoidance system instead determines that the vehicle's active suspension(s) cannot practically lift the wheel(s) over the obstacle, the obstacle avoidance system determines if the vehicle's active suspension(s) can practically jump the wheel(s) over the obstacle, as indicated by diamond 1218. If not, process 1200 ends.

On the other hand, if at diamond 1218 the obstacle avoidance system determines that the vehicle's active suspension(s) can practically jump the wheel(s) over the obstacle, the obstacle avoidance system determines one or more designated wheels to jump over the obstacle, as indicated by block 1228. That is, the obstacle avoidance system determines the particular wheels of the vehicle that must be jumped to avoid contacting the obstacle.

For each designated wheel, the obstacle avoidance system determines the actuation forces (and the appropriate directions) to apply to jump that wheel over the obstacle, as indicated by block 1230. For each designated wheel, the obstacle avoidance system also determines the actuation times at which to apply the determined actuation forces (in the appropriate directions) to jump that wheel over the obstacle, as indicated by block 1232. For each designated wheel, at the determined actuation times for that wheel, the obstacle avoidance system applies the determined actuation forces (in the appropriate directions) using the actuator of the active suspension of that wheel to jump that wheel over the obstacle, as indicated by block 1234. Process 1200 then ends.

Certain steps of process 1200 are described in more detail below 2.1 Determining Whether an Obstacle is in the Vehicle's Path The obstacle avoidance system may determine whether an obstacle is in the path of travel of the vehicle 10 and, if so, determine the obstacle's location and size in any of a variety of known manners, such as those described in U.S. Pat. No. 8,788,146, entitled "ADAPTIVE ACTIVE SUSPENSION SYSTEM WITH ROAD PREVIEW," the entire contents of which are incorporated herein by reference.

Figure 4:
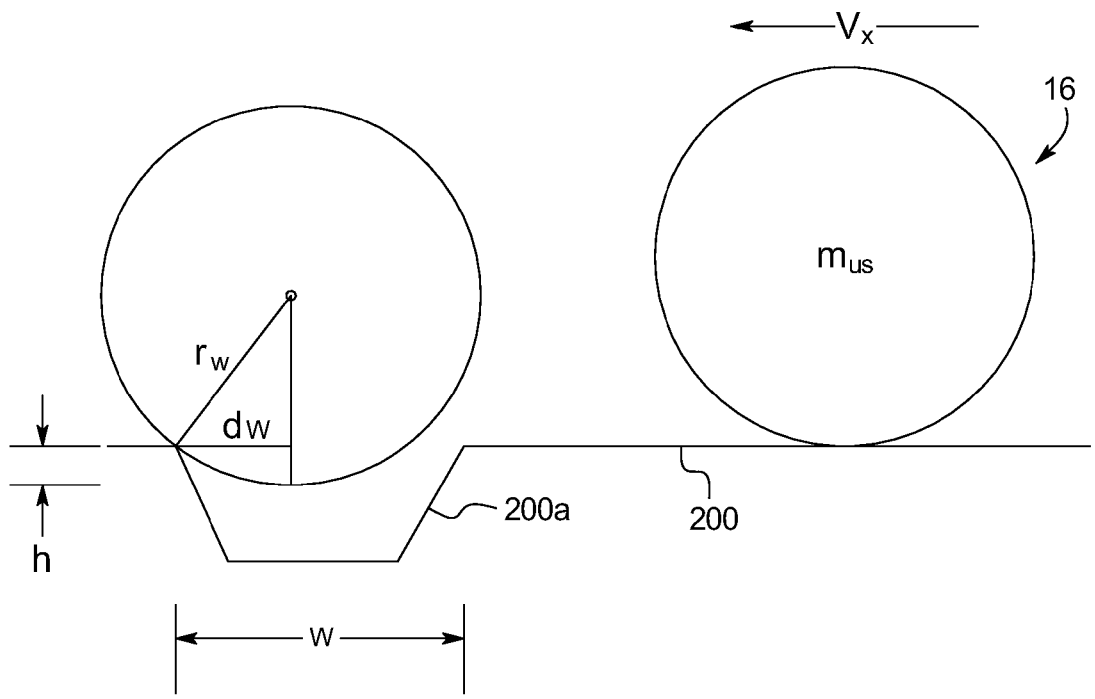
FIG. 4 is a side elevational schematic view of a wheel approaching an obstacle in the form of a depression in the road surface.

2.2 Determining Whether the Vehicle can Practically Drive Over the Obstacle 2.2.1 Obstacle in the Form of a Depression in the Road Surface FIG. 4 illustrates a scenario in which the wheel 16 is traveling toward an obstacle in the form of a depression 200a (e.g., a pothole) in the road surface 200. In this scenario, the obstacle avoidance system uses the following Equations (1) to (7) to determine whether the vehicle 10 can practically drive over the obstacle 200a at the vehicle's current speed.

$$T = \frac{W}{V_x} \tag{1}$$

$$V_z = \frac{1}{m_{us}} \int_0^T [-K_a(z_0 + Jnc) + C_a V_z] \cdot dt \tag{2}$$

$$Jnc = \int_0^T V_z \, dt \tag{3}$$

$$h = -Jnc + \frac{1}{2}gT^2 \tag{4}$$

$$dW = \sqrt{r_w^2 - (r_w - h)^2} \tag{5}$$

$$\Delta t = \frac{dW}{V_x} \tag{6}$$

$$Idx = \frac{h}{\Delta t} \tag{7}$$

T represents the time required for the wheel 16 to traverse the obstacle 200a. W represents the distance shown in FIG. 4, which is the width of the upper opening of the obstacle 200a in the direction of travel of the wheel 16 (determined via feedback from one or more sensors). $V_x$ represents the velocity of the wheel 16 in the direction of travel (determined via feedback from one or more sensors). $V_z$ represents the velocity of the wheel 16 in the direction toward the bottom of the obstacle 200a. $m_{us}$ represents the unsprung mass (a known value or determined via feedback from one or more sensors). $K_a$ represents the spring constant of the suspension spring 132 (a known value). $z_0$ represents the static deflection of the active suspension 130 (a known value or determined via feedback from one or more sensors). Jnc represents the wheel jounce (negative in this instance). $C_a$ represents the damping coefficient of the suspension damper 134 (a known value). h represents the distance shown in FIG. 4, which is the distance the wheel 16 travels below the road surface 200. g represents Earth's gravity (about 9.8 m/s²). dW represents the distance shown in FIG. 4. $r_w$ represents the radius of the wheel 16 (a known value). $\Delta t$ represents the duration of impact between the wheel 16 and the obstacle 200a. Idx represents the impact index.

Once the obstacle avoidance system determines Idx, the obstacle avoidance system compares Idx to a predetermined value. If Idx is greater than this predetermined value, the obstacle avoidance system determines that the vehicle 10 cannot practically drive over the obstacle 200a (because, for instance, doing so would damage the wheel 16). If, on the other hand, Idx is not greater than this predetermined value, the obstacle avoidance system determines that the vehicle 10 can practically drive over the obstacle 200a.

2.2.2 Obstacle that Extends Above the Road Surface

Figure 5:
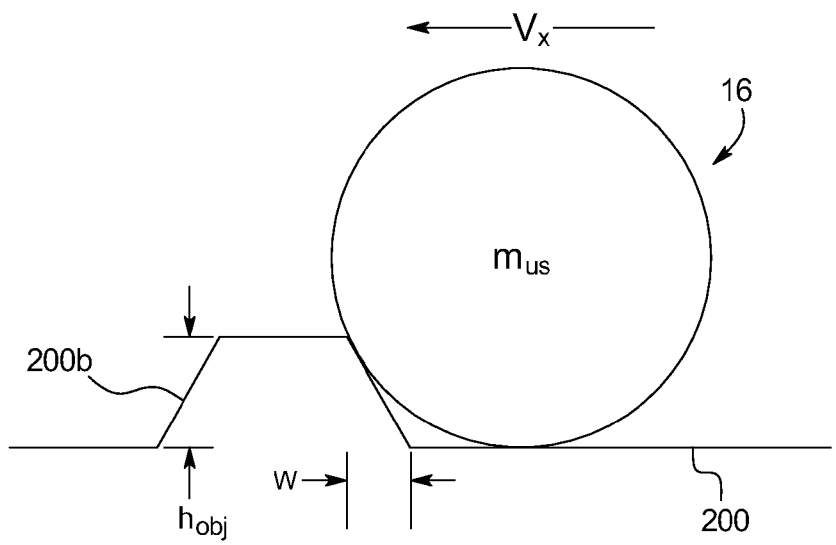
FIG. 5 is a side elevational schematic view of a wheel approaching an obstacle extending above the road surface.

FIG. 5 illustrates a scenario in which the wheel 16 is traveling toward an obstacle 200b that extends above the road surface 200. In this scenario, the obstacle avoidance system uses the following Equations (8) and (9) to determine whether the vehicle 10 can practically drive over the obstacle 200b at the vehicle's current speed.

$$\Delta t = \frac{W}{V_x} \tag{8}$$

$$Idx = \frac{h_{obj}}{\Delta t} \tag{9}$$

$\Delta t$ represents the duration of impact between the wheel 16 and the rising edge of the obstacle 200b in the direction of travel of the wheel 16. W represents the distance shown in FIG. 5, which is the width of the rising edge of the obstacle 200b in the direction of travel of the wheel 16 (determined via feedback from one or more sensors). $V_x$ represents the velocity of the wheel 16 in the direction of travel (determined via feedback from one or more sensors). $h_{obj}$ represents the distance shown in FIG. 5, which is the height of the obstacle 200b above the road surface 200 (determined via feedback from one or more sensors). Idx represents the impact index.

Once the obstacle avoidance system determines Idx, the obstacle avoidance system compares Idx to a predetermined value. If Idx is greater than this predetermined value, the obstacle avoidance system determines that the vehicle 10 cannot practically drive over the obstacle 200b. If, on the other hand, Idx is not greater than this predetermined value, the obstacle avoidance system determines that the vehicle 10 can practically drive over the obstacle 200b.

Figure 6:
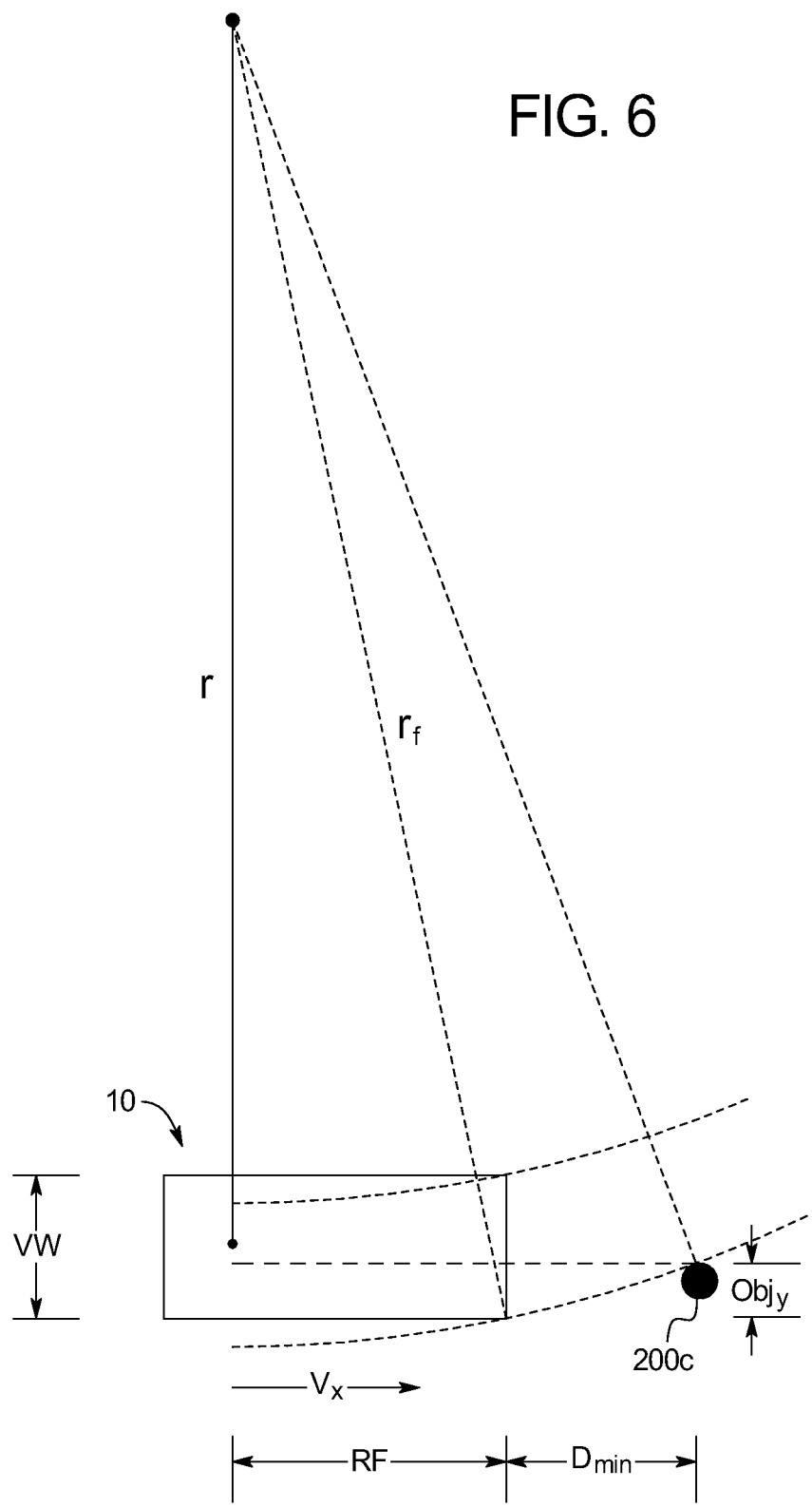
FIG. 6 is a top plan schematic view of a vehicle approaching an obstacle in the road surface.

2.3 Determining Whether the Vehicle can Practically Avoid the Obstacle by Steering Around the Obstacle FIG. 6 illustrates a scenario in which the vehicle 10 is traveling toward an obstacle 200c on the road surface 200. In this scenario, the obstacle avoidance system uses the following Equations (10) to (12) to determine whether the vehicle 10 can practically avoid the obstacle 200c by steering around the obstacle 200c.

$$r = \frac{V_x}{a_{y,max}} \quad (10)$$

$$r_f = \sqrt{\left(r + \frac{VW}{2}\right)^2 + RF^2} \quad (11)$$

$$D_{min} = \sqrt{r_f^2 - \left(r + \frac{VW}{2} - Obj_y\right)^2} - RF \quad (12)$$

r represents the turning radius of the vehicle 10 (a known value or determined via feedback from one or more sensors). $V_x$ represents the velocity of the vehicle 10 in the direction of travel (determined via feedback from one or more sensors). $a_{y,max}$ represents the maximum allowed lateral acceleration of the vehicle 10 (e.g., 0.7 g). $r_f$ represents the distance from the turn center of the vehicle 10 to the outside front corner of the vehicle 10 (a known value or determined via feedback from one or more sensors). VW represents the width of the vehicle 10 (a known value). RF represents the distance from the rear axle of the vehicle 10 to the front bumper of the vehicle 10 (a known value). $D_{min}$ represents the minimum distance between the vehicle 10 and the obstacle 200c necessary for the vehicle 10 to practically be able to steer around the obstacle 200c. $Obj_y$ represents the lateral offset of the obstacle 200 from the outside front corner of the vehicle 10 (determined via feedback from one or more sensors).

Once the obstacle avoidance system determines $D_{min}$, the obstacle avoidance system determines whether the actual distance between the vehicle and the obstacle 200c is greater than $D_{min}$. If the actual distance between the vehicle and the obstacle 200c is greater than $D_{min}$, the obstacle avoidance system determines that the vehicle 10 can practically steer around the obstacle 200c. If, on the other hand, the actual distance between the vehicle and the obstacle 200c is not greater than $D_{min}$, the obstacle avoidance system determines that the vehicle 10 cannot practically steer around the obstacle 200c.

2.4 Determining Whether the Vehicle can Practically Stop Before Hitting the Obstacle In one embodiment, the obstacle avoidance system uses the following Equations (13) to (15) to determine whether the vehicle 10 can practically stop before hitting an obstacle in its path.

$$\mu = \max\left(\sqrt{a_x^2 + a_y^2}\right) \quad (13)$$

$$t = \frac{V_x}{a_{x,max}} \quad (14)$$

$$D_{min} = V_x t - \frac{1}{2} a_{x,max} t^2 \quad (15)$$

μ represents the estimated road friction. $a_x$ represents the lateral acceleration of the vehicle 10 (determined via feedback from one or more sensors). $a_y$ represents the longitudinal acceleration of the vehicle 10 (determined via feedback from one or more sensors). $a_{x,max}$ represents the maximum lateral deceleration of the vehicle 10 that can be achieved (a known value or determined via feedback from one or more sensors). t represents the time it would take to stop the vehicle 10 at the maximum lateral deceleration. $V_x$ represents the velocity of the vehicle 10 in the direction of travel (determined via feedback from one or more sensors). $D_{min}$ represents the minimum distance between the vehicle 10 and the obstacle necessary for the vehicle 10 to practically be able to stop before hitting the obstacle.

Specifically, the obstacle avoidance system first estimates the road friction μ using Equation (13). The obstacle avoidance system then chooses the maximum lateral deceleration of the vehicle 10 that can be achieved $a_{x,max}$, which should be less than the estimated road friction μ. The obstacle avoidance system them determines t and $D_{min}$ using Equations (14) and (15), respectively.

Once the obstacle avoidance system determines $D_{min}$, the obstacle avoidance system determines whether the actual distance between the vehicle and the obstacle is greater than $D_{min}$. If the actual distance between the vehicle and the obstacle is greater than $D_{min}$, the obstacle avoidance system determines that the vehicle 10 can practically stop before hitting the obstacle. If, on the other hand, the actual distance between the vehicle and the obstacle is not greater than $D_{min}$, the obstacle avoidance system determines that the vehicle 10 cannot practically stop before hitting the obstacle.

2.5 Determining if the Active Suspension(s) can Practically Lift the Wheel(s) Over the Obstacle Lifting a wheel using the active suspension of that wheel involves the actuator of the active suspension quickly applying an actuation force on the control arm to which that wheel is attached in a direction toward the vehicle body.

2.5.1 Obstacle in the Form of a Depression in the Road Surface

Figure 7:
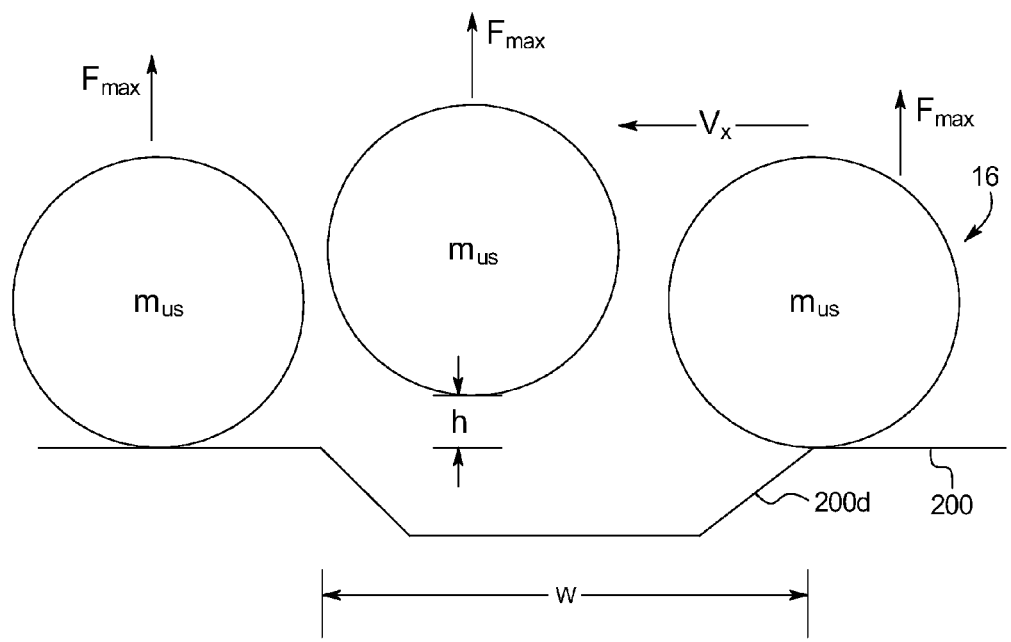
FIG. 7 is a side elevational schematic view of a wheel approaching and being lifted over an obstacle in the form of a depression in the road surface.

FIG. 7 illustrates a scenario in which the wheel 16 is traveling toward an obstacle in the form of a depression 200d (e.g., a pothole) in the road surface 200. In this scenario, the obstacle avoidance system uses the following Equations (16) to (19) to determine whether the active suspensions can practically lift one or more wheels of the vehicle 10 over the obstacle 200d.

$$T = \frac{W}{V_x} \quad (16)$$

$$V_z = \frac{1}{m_{us}} \int_0^T [F_{max} - K_a(z_0 + Jnc) + C_a V_z] \cdot dt \quad (17)$$

$$Jnc = \int_0^T V_z dt \quad (18)$$

-continued $$h(T) = Jnc - \frac{1}{2}gT^2 \quad (19)$$

T represents the time required for the wheel 16 to traverse the obstacle 200d. W represents the distance shown in FIG. 8, which is the width of the upper opening of the obstacle 200d in the direction of travel of the wheel 16 (determined via feedback from one or more sensors). $V_x$ represents the velocity of the wheel 16 in the direction of travel (determined via feedback from one or more sensors). $V_z$ represents the jounce velocity. $m_{us}$ represents the unsprung mass (a known value or determined via feedback from one or more sensors). $F_{max}$ represents the maximum force the active suspension can apply (a known value or determined via feedback from one or more sensors). $K_a$ represents the spring constant of the suspension spring (a known value). $z_0$ represents the static deflection of the active suspension (a known value or determined via feedback from one or more sensors). Jnc represents the wheel jounce (positive in this instance). $C_a$ represents the damping coefficient of the suspension damper (a known value). h represents the distance shown in FIG. 7, which is the distance the wheel 16 travels above the road surface 200. g represents Earth's gravity (about 9.8 m/s²).

Once the obstacle avoidance system determines h(T), the obstacle avoidance system determines whether h(T) is greater than zero. If h(T) is greater than zero, the obstacle avoidance system determines that the active suspension can practically lift the wheel 16 over the obstacle 200d. If, on the other hand, h(T) is not greater than zero, the obstacle avoidance system determines that the active suspension cannot practically lift the wheel 16 over the obstacle 200d.

2.5.2 Obstacle that Extends Above the Road Surface

Figure 8:
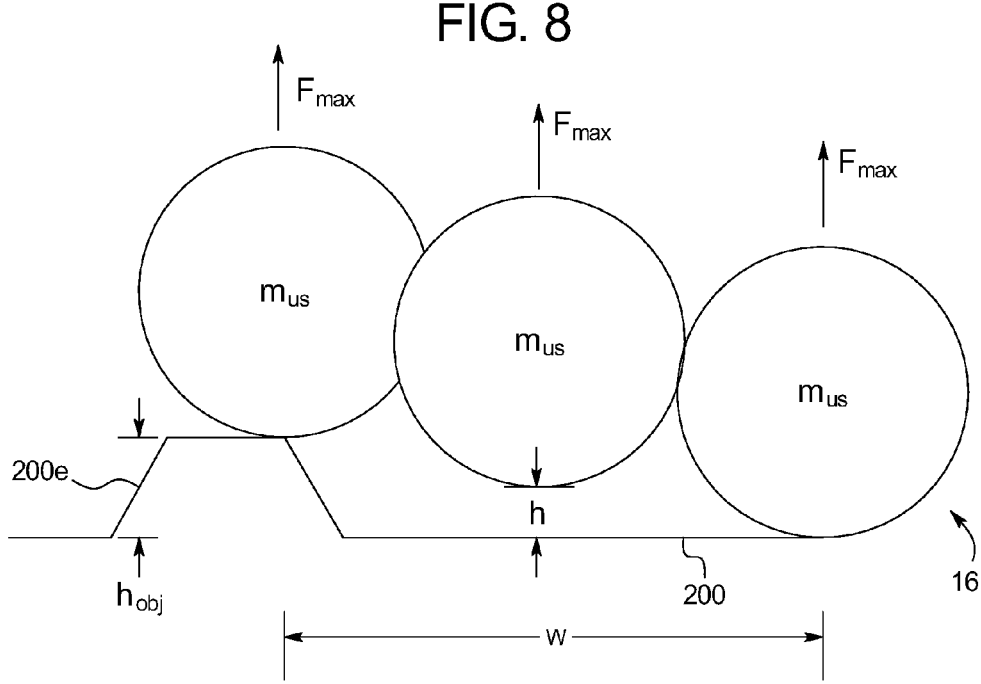
FIG. 8 is a side elevational schematic view of a wheel approaching and being lifted over an obstacle extending above the road surface.

FIG. 8 illustrates a scenario in which the wheel 16 is traveling toward an obstacle 200e that extends above the road surface 200. In this scenario, the obstacle avoidance system uses the following Equations (20) to (22) to determine whether the active suspensions can practically lift one or more wheels of the vehicle 10 over the obstacle 200e.

$$V_z = \frac{1}{m_{us}} \int_0^T [F_{max} - K_a(z_0 + Jnc) + C_a V_z] \cdot dt \quad (20)$$

$$Jnc = \int_0^T V_z \, dt \quad (21)$$

$$h(T) = Jnc - \frac{1}{2}gT^2 \quad (22)$$

T represents the time required to reach the jounce bumper. $V_z$ represents the jounce velocity. $m_{us}$ represents the unsprung mass (a known value or determined via feedback from one or more sensors). $F_{max}$ represents the maximum force the active suspension can apply (a known value or determined via feedback from one or more sensors). $K_a$ represents the spring constant of the suspension spring (a known value). $z_0$ represents the static deflection of the active suspension (a known value or determined via feedback from one or more sensors). Jnc represents the wheel jounce (positive in this instance). $C_a$ represents the damping coefficient of the suspension damper (a known value). h represents the distance shown in FIG. 8, which is the distance the wheel 16 travels above the road surface 200. g represents Earth's gravity (about 9.8 m/s²). $h_{obj}$ represents the distance shown in FIG. 8, which is the height of the obstacle 200e above the road surface 200 (determined via feedback from one or more sensors).

Specifically, the obstacle avoidance system uses Equations (20) and (21) to determine T such that Jnc is the maximum jounce. The obstacle avoidance system then determines h(T) using Equation (22).

Once the obstacle avoidance system determines h(T), the obstacle avoidance system determines whether h(T) is greater than $h_{obj}$. If h(T) is greater than $h_{obj}$, the obstacle avoidance system determines that the active suspension can practically lift the wheel 16 over the obstacle 200e. If, on the other hand, h(T) is not greater than $h_{obj}$, the obstacle avoidance system determines that the active suspension cannot practically lift the wheel 16 over the obstacle 200e.

2.6 Determining which Wheels to Lift and when to Lift them 2.6.1 Obstacle in the Form of a Depression in the Road Surface If the obstacle avoidance system determines that the active suspensions can practically lift their corresponding wheels over an obstacle in the form of a depression in the road surface, such as the obstacle 200d shown in FIG. 7, the obstacle avoidance system determines the designated wheel or wheels on whose path the obstacle is present via feedback from one or more sensors. For each designated wheel, the obstacle avoidance system controls the actuator of the active suspension of that designated wheel to lift that designated wheel just before that designated wheel reaches the obstacle (as determined via feedback from one or more sensors).

2.6.2 Obstacle that Extends Above the Road Surface

If the obstacle avoidance system determines that the active suspensions can practically lift their corresponding wheels over an obstacle that extends above the road surface, such as the obstacle 200e shown in FIG. 8, the obstacle avoidance system determines the designated wheel or wheels on whose path the obstacle is present. The obstacle avoidance system uses the following Equation (23) to determine when to control the actuator(s) of the active suspension(s) of the designated wheel(s) to lift the designated wheel(s).

$$W = V_x \cdot T \quad (23)$$

W represents the distance shown in FIG. 8, which is the distance between the center of the wheel 16 and the top of the rising edge of the obstacle 200e when the active suspension begins lifting the wheel 16. $V_x$ represents the velocity of the wheel 16 in the direction of travel. T represents the time required to reach the jounce bumper.

For each designated wheel, the obstacle avoidance system controls the actuator of the active suspension of that designated wheel to lift that designated wheel when the horizontal distance between the center of that designated wheel and the top of the rising edge of the obstacle is equal to W (as determined via feedback from one or more sensors).

2.7 Determining if the Active Suspension(s) can Practically Jump the Wheel(s) Over the Obstacle Jumping a wheel using the active suspension of that wheel involves a series of steps: (1) the actuator of the active suspension slowly applying a first actuation force on the control arm to which that wheel is attached in a direction toward the vehicle body until the active suspension reaches its jounce stop; (2) the actuator of the active suspension quickly applying a second actuation force on the control arm in a direction away from the vehicle body until the active suspension reaches its rebound stop, which causes the wheel to elevate off the road surface; and (3) once the velocity of the wheel in the vertical direction reaches zero, the actuator of the active suspension quickly applying a third actuation force on the control arm in a direction toward the body until the active suspension reaches its jounce stop, which enables the wheel to clear the obstacle.

2.7.1 Obstacle that Extends Above the Road Surface

Figure 9:
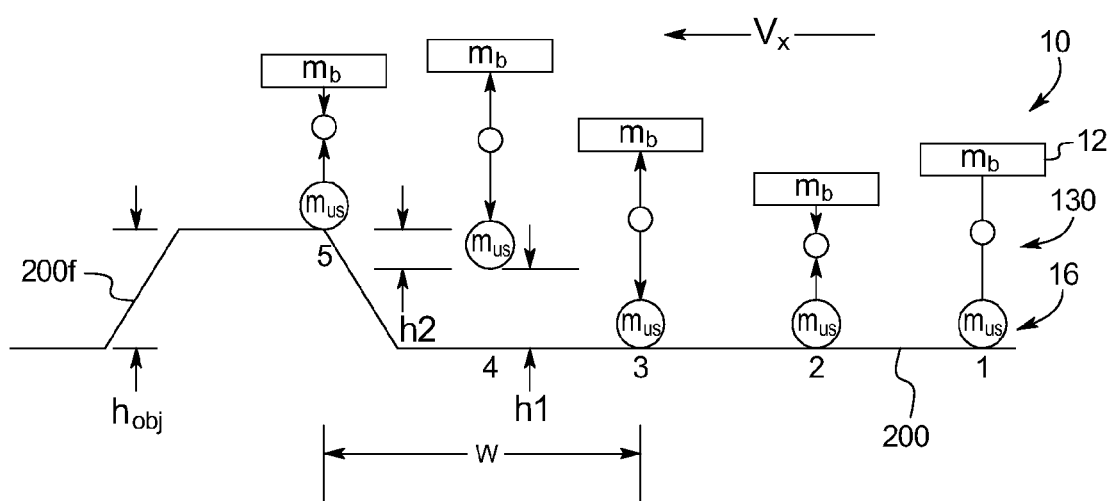
FIG. 9 is a side elevational schematic view of a wheel approaching and being jumped over an obstacle extending above the road surface.

FIG. 9 illustrates a scenario in which the wheel 16 is traveling toward an obstacle 200f that extends above the road surface 200. In this scenario, the obstacle avoidance system uses the following Equations (24) to (30) to determine whether the active suspensions can practically jump one or more wheels of the vehicle 10 over the obstacle 200f.

FIG. 9 illustrates Stages 1 to 5 that the vehicle 10 goes through when jumping the wheel 16 over the obstacle 200f. Stage 1 shows the active suspension 130 at its normal height, prior to the jump. Stage 2 shows the active suspension 130 compressed until it has reached the jounce stop ($J_{stop}$, a known value) to prepare to jump. Stage 3 indicates the active suspension 130 after it has been quickly extended and reached the rebound stop ($R_{stop}$, a known value). Stage 4 indicates the wheel 16 airborne at a point in time at which the wheel's velocity in the vertical direction has reached zero. Stage 5 indicates the active suspension 130 being quickly compressed to bring the wheel 16 closer to the vehicle body and clear the obstacle 200f.

$$V_z = \frac{1}{m_b} \int_0^{T_1} [F_{max} + K_a \cdot Jnc - C_a V_z] \cdot dt \quad (24)$$

$$Jnc = J_{stop} - \int_0^{T_1} V_z \, dt \quad (25)$$

$$T_2 = \frac{V_z(T_1)}{g} \quad (26)$$

$$h_1 = V_z(T_1)T_2 - \frac{1}{2}gT_2^2 \quad (27)$$

$$V_z = \frac{1}{m_{us}} \int_0^{T_3} [F_{max} - K_a(z_0 + Jnc) - C_a V_z] \cdot dt \quad (28)$$

$$Jnc = R_{stop} + \int_0^{T_3} V_z \, dt \quad (29)$$

$$h_2 = Jnc - \frac{1}{2}gT_3^2 \quad (30)$$

$V_z$ represents the jounce velocity/rebound velocity. $m_b$ represents the vehicle body mass (a known value or determined via feedback from one or more sensors). $m_{us}$ represents the unsprung mass (a known value or determined via feedback from one or more sensors). $F_{max}$ represents the maximum force the active suspension can apply (a known value or determined via feedback from one or more sensors). $K_a$ represents the spring constant of the suspension spring (a known value). $z_0$ represents the static deflection of the active suspension (a known value or determined via feedback from one or more sensors). Jnc represents the wheel jounce. $C_a$ represents the damping coefficient of the suspension damper (a known value). $R_{stop}$ represents the rebound stop of the active suspension (a known value). $h_1$ represents the distance of wheel 16 above the road surface 200 at Stage 4. $h_2$ represents the distance between the bottom of the wheel 16 at Stage 4 and the bottom of the wheel 16 at Stage 5. g represents Earth's gravity (about 9.8 m/s²). $T_1$ represents the time from Stage 2 to Stage 3. $T_2$ represents the time from Stage 3 to Stage 4. $T_3$ represents the time from Stage 4 to Stage 5.

Specifically, the obstacle avoidance system uses Equations (24) and (25) to determine $T_1$ such that Jnc equals $R_{stop}$. The obstacle avoidance system uses Equations (28) and (29) to determine $T_3$ such that Jnc equals $J_{stop}$.

Once the obstacle avoidance system determines $h_1$ and $h_2$, the obstacle avoidance system determines whether $h_1+h_2$ is greater than $h_{opj}$. If $h_1+h_2$ is greater than $h_{obj}$, the obstacle avoidance system determines that the active suspension can practically jump the wheel 16 over the obstacle 200f. If, on the other hand, $h_1+h_2$ is not greater than $h_{opj}$, the obstacle avoidance system determines that the active suspension cannot practically jump the wheel 16 over the obstacle 200f.

2.7.2 Obstacle in the Form of a Depression in the Road Surface

Figure 10:
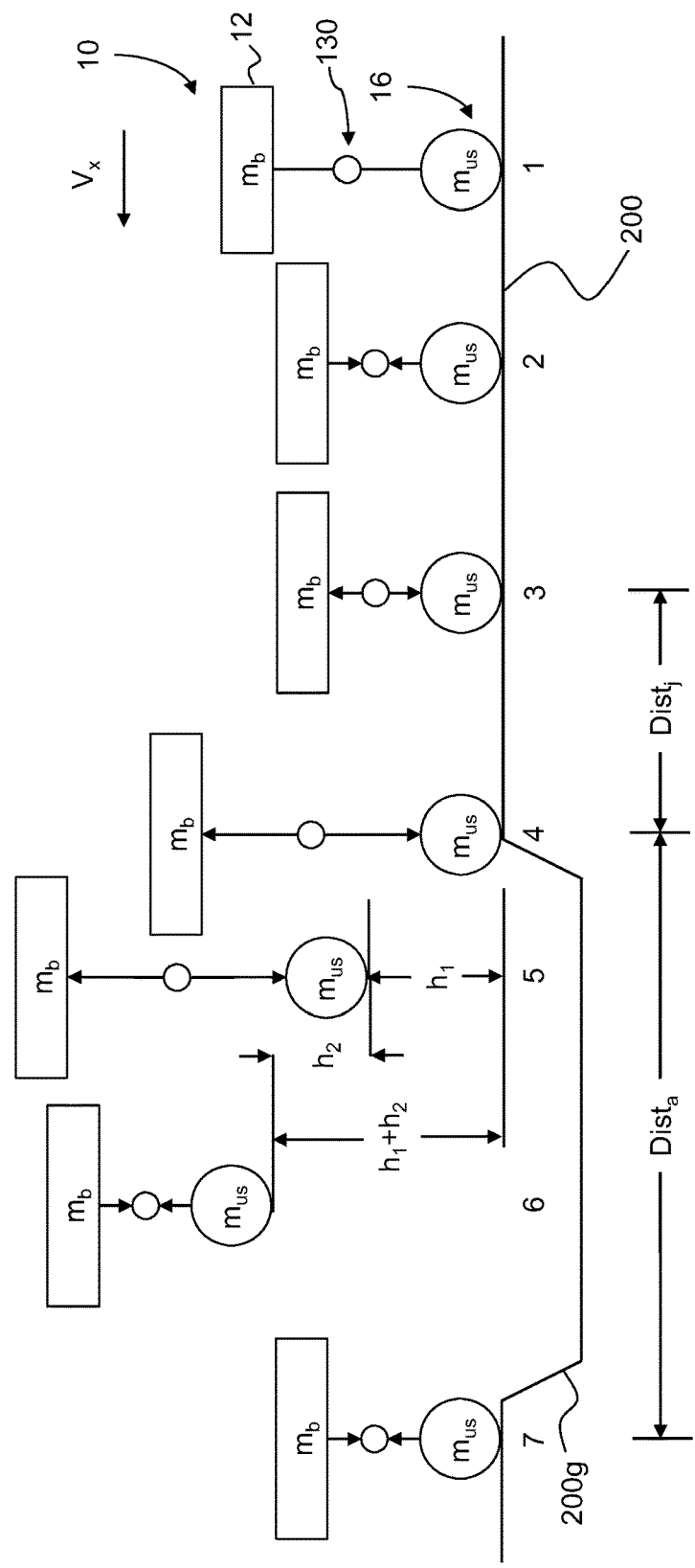
FIG. 10 is a side elevational schematic view of a wheel approaching and being jumped over an obstacle in the form of a depression in the road surface.

FIG. 10 illustrates a scenario in which the wheel 16 is traveling toward an obstacle in the form of a depression 200g (e.g., a pothole) in the road surface 200. In this scenario, the obstacle avoidance system uses the following Equations (31) to (39) to determine whether the active suspensions can practically lift one or more wheels of the vehicle 10 over the obstacle 200g.

FIG. 10 illustrates Stages 1 to 7 that the vehicle 10 goes through when jumping the wheel 16 over the obstacle 200g. Stage 1 shows the active suspension 130 at its normal height, prior to the jump. Stage 2 shows the active suspension 130 compressed until it has reached the jounce stop ($J_{stop}$, a known value) to prepare to jump. Stage 3 indicates the point in time at which the active suspension 130 begins extending after it has reached the jounce stop. Stage 4 indicates the active suspension 130 after it has been quickly extended and reached the rebound stop ($R_{stop}$, a known value). Stage 5 indicates the wheel 16 airborne at a point in time at which the wheel's velocity in the vertical direction has reached zero. Stage 6 indicates the active suspension 130 being quickly compressed to bring the wheel 16 closer to the vehicle body and clear the obstacle 200g. Stage 7 indicates the wheel 16 after it has landed on the road surface 200.

$$V_z = \frac{1}{m_b} \int_0^{T_1} [F_{max} + K_a \cdot Jnc - C_a V_z] \cdot dt \quad (31)$$

$$Jnc = J_{stop} - \int_0^{T_1} V_z \, dt \quad (32)$$

$$T_2 = \frac{V_z(T_1)}{g} \quad (33)$$

$$h_1 = V_z(T_1)T_2 - \frac{1}{2}gT_2^2 \quad (34)$$

$$V_z = \frac{1}{m_{us}} \int_0^{T_3} [F_{max} - K_a(z_0 + Jnc) - C_a V_z] \cdot dt \quad (35)$$

$$Jnc = R_{stop} + \int_0^{T_3} V_z \, dt \quad (36)$$

$$h_2 = Jnc - \frac{1}{2}gT_3^2 \quad (37)$$

$$T_4 = \sqrt{\frac{2(h_1 + h_2)}{g}} \quad (38)$$

$$Dist_a = V_x \cdot (T_2 + T_3 + T_4) \quad (39)$$

$V_z$ represents the jounce velocity/rebound velocity. $m_b$ represents the vehicle body mass (a known value or determined via feedback from one or more sensors). $m_{us}$ represents the unsprung mass (a known value or determined via feedback from one or more sensors). $F_{max}$ represents the maximum force the active suspension can apply (a known value or determined via feedback from one or more sensors). $K_a$ represents the spring constant of the suspension spring (a known value). $z_0$ represents the static deflection of the active suspension (a known value or determined via feedback from one or more sensors). Jnc represents the wheel jounce. $C_a$ represents the damping coefficient of the suspension damper (a known value). $R_{stop}$ represents the rebound stop of the active suspension (a known value). $h_1$ represents the distance of wheel 16 above the road surface 200 at Stage 5. $h_2$ represents the distance between the bottom of the wheel 16 at Stage 5 and the bottom of the wheel 16 at Stage 6. g represents Earth's gravity (about 9.8 m/s$^2$). $T_1$ represents the time from Stage 3 to Stage 4. $T_2$ represents the time from Stage 4 to Stage 5. $T_3$ represents the time from Stage 5 to Stage 6. $T_4$ represents the time from Stage 6 to Stage 7. Dist$_a$ represents the distance shown in FIG. 10, which is the distance between the center of the wheel 16 when the wheel 16 leaves the road surface 200 and the center of the wheel 16 when the wheel 16 returns to the road surface 200 in the direction of travel.

Specifically, the obstacle avoidance system uses Equations (31) and (32) to determine $T_1$ such that Jnc equals $R_{stop}$. The obstacle avoidance system uses Equations (35) and (36) to determine $T_3$ such that Jnc equals $J_{stop}$.

Once the obstacle avoidance system determines Dist$_a$, the obstacle avoidance system determines whether Dist$_a$ is greater than the width of the obstacle 200g in the direction of travel. If Dist$_a$ is greater than the width of the obstacle 200g in the direction of travel, the obstacle avoidance system determines that the active suspension can practically jump the wheel 16 over the obstacle 200g. If, on the other hand, Dist$_a$ is not greater than the width of the obstacle 200g in the direction of travel, the obstacle avoidance system determines that the active suspension cannot practically jump the wheel 16 over the obstacle 200g.

2.8 Determining which Wheels to Jump and when to Jump them 2.8.1 Obstacle that Extends Above the Road Surface If the obstacle avoidance system determines that the active suspensions can practically lift their corresponding wheels over an obstacle that extends above the road surface, such as the obstacle 200f shown in FIG. 9, the obstacle avoidance system determines the designated wheel or wheels on whose path the obstacle is present. The obstacle avoidance system uses the following Equation (40) to determine when to control the actuator(s) of the active suspension(s) of the designated wheel(s) to jump the designated wheel(s).

$$W = V_x \cdot (T_1 + T_2 + T_3) \tag{40}$$

W represents the distance shown in FIG. 9, which is the distance between the center of the wheel 16 and the top of the rising edge of the obstacle 200f when the wheel 16 leaves the road surface 200 in the direction of travel. $V_x$ represents the velocity of the wheel 16 in the direction of travel. $T_1$ represents the time from Stage 2 to Stage 3. $T_2$ represents the time from Stage 3 to Stage 4. $T_3$ represents the time from Stage 4 to Stage 5.

For each designated wheel, the obstacle avoidance system controls the actuator of the active suspension of that designated wheel to begin jumping that designated wheel (i.e., begin the Stage 2 suspension spring compression) such that the horizontal distance between the center of that designated wheel and the top of the rising edge of the obstacle when the wheel 16 begins leaving the road surface 200 is equal to W.

2.8.2 Obstacle in the Form of a Depression in the Road Surface

If the obstacle avoidance system determines that the active suspensions can practically lift their corresponding wheels over an obstacle in the form of a depression in the road surface, such as the obstacle 200g shown in FIG. 10, the obstacle avoidance system determines the designated wheel or wheels on whose path the obstacle is present. The obstacle avoidance system uses the following Equation (41) to determine when to control the actuator(s) of the active suspension(s) of the designated wheel(s) to jump the designated wheel(s).

$$\text{Dist}_j = V_x \cdot T_1 \tag{41}$$

Dist$_j$ represents the distance shown in FIG. 10, which is the distance between the center of the wheel 16 when the active suspension 130 begins extending at Stage 3 and the center of the wheel 16 when the wheel 16 leaves the road surface 200 at Stage 4 in the direction of travel. $V_x$ represents the velocity of the wheel 16 in the direction of travel. $T_1$ represents the time from Stage 3 to Stage 4.

For each designated wheel, the obstacle avoidance system controls the actuator of the active suspension of that designated wheel to begin jumping that designated wheel (i.e., begin the Stage 2 suspension spring compression) such that the distance between the center of that designated wheel and the edge of the obstacle when the active suspension begins extending at Stage 3 is equal to Dist$_j$.

3. Variations

In certain embodiments, if the obstacle avoidance system determines that an obstacle is in the vehicle's path but that the vehicle can practically drive over the obstacle at its current speed, the obstacle avoidance system causes an indication to be provided to the driver to inform the driver of this fact. For instance, in one example embodiment the obstacle avoidance system causes the vehicle's speakers to output a message that an obstacle is in the vehicle's path but that it is practical to drive over the obstacle.

In various embodiments, if the obstacle avoidance system determines that an obstacle is in the vehicle's path but that the vehicle can practically avoid the obstacle by steering around it, the obstacle avoidance system causes an indication to be provided to the driver to inform the driver of this fact. The indication may include instructions for steering the vehicle around the obstacle. For instance, in one example embodiment the obstacle avoidance system causes the vehicle's speakers to output a message that an obstacle is in the vehicle's path and to turn right to steer around the obstacle. In another example embodiment, the obstacle avoidance system causes a display device of the vehicle (such as the display device of the vehicle's infotainment system) to display a message that an obstacle is in the vehicle's path and to turn right to steer around the obstacle. In other embodiments, if the obstacle avoidance system determines that an obstacle is in the vehicle's path but that the vehicle can practically avoid the obstacle by steering around it, an autonomous driving system of the vehicle takes control of the vehicle to steer the vehicle around the obstacle.

In certain embodiments, if the obstacle avoidance system determines that an obstacle is in the vehicle's path but that the vehicle can practically stop before the vehicle hits the obstacle, the obstacle avoidance system causes an indication to be provided to the driver to inform the driver of this fact. The indication may include instructions to begin braking. For instance, in one example embodiment the obstacle avoidance system causes the vehicle's speakers to output a message that an obstacle is in the vehicle's path and to immediately begin braking to stop the vehicle before the vehicle hits the obstacle. In another example embodiment, the obstacle avoidance system causes a display device of the vehicle (such as the display device of the vehicle's infotainment system) to display a message that an obstacle is in the vehicle's path and to immediately begin braking to stop the vehicle before the vehicle hits the obstacle. In other embodiments, if the obstacle avoidance system determines that an obstacle is in the vehicle's path but that the vehicle can practically stop before the vehicle hits the obstacle, an autonomous driving system of the vehicle takes control of the vehicle to stop the vehicle before the vehicle hits the obstacle.

In various embodiments, if the obstacle avoidance system determines that an obstacle is in the vehicle's path but that the active suspension(s) cannot practically lift or jump the wheel(s) over the obstacle, the obstacle avoidance system causes an indication to be provided to the driver to inform the driver of this fact. The indication may include instructions to prepare for impact. For instance, in one example embodiment the obstacle avoidance system causes the vehicle's speakers to output a message that an obstacle is in the vehicle's path and to immediately prepare for impact. In another example embodiment, the obstacle avoidance system causes a display device of the vehicle (such as the display device of the vehicle's infotainment system) to display a message that an obstacle is in the vehicle's path and to immediately prepare for impact.

In certain embodiments, when the obstacle avoidance system determines to jump one or more wheels of the vehicle over an obstacle, the obstacle avoidance system causes the actuator(s) of the active suspension(s) for the wheel(s) to oscillate the active suspension(s) before the wheel(s) reach the obstacle. This oscillation before jumping minimizes the actuation force required to jump over the obstacle and also enables jumping over taller obstacles.

Any process descriptions or blocks in the figures, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. An obstacle avoidance system comprising:
  a sensor configured to obtain data external to a vehicle;
  an active suspension coupled to a wheel of the vehicle, the active suspension including an actuator and a spring and disposed between a body of the vehicle and a control arm connected to the wheel of the vehicle; and
  a controller configured to:
    identify, based on the obtained data, an obstacle in a path of the wheel;
    determine whether the vehicle is able to steer the wheel around the obstacle;
    determine whether the vehicle is able to stop before the wheel hits the obstacle; and
    responsive to determining that the vehicle is unable to at least one of steer the wheel around the obstacle or stop before hitting the obstacle, independently control the active suspension to rapidly elevate the wheel by controlling the actuator to:
      when the obstacle has a first size, retract to lift the control arm and compress the spring to cause the wheel to be lifted over the obstacle, and
      when the obstacle has a second greater size, retract to lift the control arm and compress the spring, extend to lower the control arm and decompress the spring, and re-retract to re-lower the control arm and recompress the spring to cause the wheel to jump airborne over the obstacle.

2. The obstacle avoidance system of claim 1, wherein the actuator applies a downward force to the control arm when extending to lower the control arm and decompress the spring.

3. The obstacle avoidance system of claim 1, wherein the actuator applies an upward force to the control arm when retracting to lift the control arm and compress the spring.

4. The obstacle avoidance system of claim 1, wherein the controller is configured to:
  determine when the wheel can be driven over the obstacle; and
  control the active suspension to elevate the wheel over the obstacle when the vehicle cannot at least one of practically drive over the obstacle, steer around the obstacle, or stop before hitting the obstacle.

5. The obstacle avoidance system of claim 1, wherein the controller is to:
  identify a location and a size of the obstacle based on the data obtained by the sensor; and
  determine that the obstacle is in the path of the wheel of the vehicle.

6. The obstacle avoidance system of claim 1, wherein the controller determines an actuation force and actuation time for the actuator that enables the actuator to lift the wheel over the obstacle.

7. The obstacle avoidance system of claim 1, wherein the controller determines actuation forces and respective actuation times for the actuator that enable the actuator to cause the wheel to jump airborne over the obstacle.

8. The obstacle avoidance system of claim 1, wherein the controller:
  determines that the vehicle cannot steer around the obstacle in response to determining that a distance between the vehicle and the obstacle is less than a minimum steering distance based on a speed of the vehicle; and
  determines that the vehicle cannot stop before hitting the obstacle in response to identifying that the distance between the vehicle and the obstacle is less than a minimum stopping distance based on the speed of the vehicle.

9. The obstacle avoidance system of claim 4, wherein the controller determines that the vehicle cannot drive over the obstacle in response to:
  determining an impact index of the obstacle based on the data obtained by the sensor; and
  identifying that the impact index of the obstacle is greater than a predetermined threshold.

10. The obstacle avoidance system of claim 1, further including an autonomous driving system to steer the wheel around the obstacle responsive to the controller determining that the vehicle is able to steer the wheel around the obstacle.

11. The obstacle avoidance system of claim 10, wherein the autonomous driving system is to stop the vehicle responsive to the controller determining that the vehicle is able to stop before the wheel hits the obstacle.

12. An obstacle avoidance method comprising:
obtaining, by a sensor, data external to a vehicle;
identifying, by a controller using the data, an obstacle in a path of the vehicle;
determining, by the controller using the data, whether the vehicle can at least one of steer around the obstacle or stop before hitting the obstacle; and
in response to determining that the vehicle cannot at least one of steer around or stop before hitting the obstacle, independently controlling, by the controller, an active suspension disposed between a vehicle body and a control arm connected to a wheel of the vehicle to rapidly elevate the wheel over the obstacle by:
when the obstacle has a first size, retracting an actuator of the active suspension to lift the control arm toward the body and compress a spring of the active suspension to cause the wheel to lift over the obstacle, and
when the obstacle has a second greater size, retracting the actuator to lift the control arm and compress the spring, extend to lower the control arm and decompress the spring, and re-retract to re-lift the control arm and re-compress the spring to cause the wheel to jump airborne over the obstacle.

13. The obstacle avoidance method of claim 12, wherein the actuator applies a downward force to the control arm when extending to lower the control arm and decompress the spring.

14. The obstacle avoidance method of claim 13, wherein the actuator applies an upward force to the control arm when retracting to lift the control arm and compress the spring.

15. The obstacle avoidance method of claim 12, which includes determining, by the controller, whether the vehicle can drive over the obstacle.

16. The obstacle avoidance method of claim 15, which includes controlling, by the controller, the active suspension to elevate the wheel over the obstacle when the vehicle cannot drive over the obstacle, the vehicle cannot steer around the obstacle, and the vehicle cannot stop before hitting the obstacle.

17. The obstacle avoidance method of claim 12, further including steering the vehicle, via an autonomous driving system, around the obstacle responsive to determining that the vehicle can steer around the obstacle.

18. The obstacle avoidance method of claim 12, further including stopping the vehicle, via the autonomous driving system, responsive to determining that the vehicle can stop before hitting the vehicle.

* * * * *